US012009112B2

(12) United States Patent
Ford et al.

(10) Patent No.: US 12,009,112 B2
(45) Date of Patent: Jun. 11, 2024

(54) FUSION GENERATOR

(71) Applicant: KRONOS FUSION ENERGY IP HOLDING COMPANY LLC, Irvine, CA (US)

(72) Inventors: Priyanca Ford, Irvine, CA (US); Carl Frederick Weggel, Andover, MA (US); Robert Weggel, Reading, MA (US)

(73) Assignee: KRONOS FUSION ENERGY IP HOLDING COMPANY LLC, Irvine, CA (US)

( * ) Notice: Subject to any disclaimer, the term of this patent is extended or adjusted under 35 U.S.C. 154(b) by 0 days.

(21) Appl. No.: 17/878,550

(22) Filed: Aug. 1, 2022

(65) Prior Publication Data
US 2024/0029903 A1  Jan. 25, 2024

(51) Int. Cl.
*G21B 1/05* (2006.01)
*G21B 1/17* (2006.01)
*H05H 1/12* (2006.01)
*G21B 1/21* (2006.01)

(52) U.S. Cl.
CPC .............. *G21B 1/057* (2013.01); *G21B 1/17* (2013.01); *H05H 1/12* (2013.01); *G21B 1/21* (2013.01)

(58) Field of Classification Search
CPC . G21B 1/057; G21B 1/17; G21B 1/21; H05H 1/12
USPC .................................................. 376/133, 136
See application file for complete search history.

(56) References Cited

U.S. PATENT DOCUMENTS 4,713,208 A * 12/1987 Furth .................. H05H 1/12
 376/128
5,675,304 A * 10/1997 Georgiyevskiy ......... G21B 1/11
 376/133
2016/0247615 A1* 8/2016 Gupta ....................... H01F 6/04

OTHER PUBLICATIONS

Bombarda, "The tilted-coil concept for advanced tokamak devices", In ENEA Technical Report 14/529. 2015. (Year: 2015).*
Jafari, "Morphology control of graphene by LPCVD", Journal of Fusion Energy 34 (2015): 532-539. (Year: 2015).*
Bingren, "Core plasma characteristics of a spherical tokamak D-3He fusion reactor", Plasma Science and Technology 7, No. 2 (2005): 2767. (Year: 2005).*
Chen, "Development of fast response freezing valve for liquid lithium application in tokamak", Vacuum 127 (2016): 73-81. (Year: 2016).*
Dunlea, "Magnetic levitation and compression of compact tori", Physics of Plasmas 27, No. 6 (2020). (Year: 2020).*
Pahlavani, "Electromagnetic torque and force analysis of toroidal field coil using numerical and experimental results applicable to tokamak reactors", IEEE transactions on plasma science 38, No. 7 (2010): 1632-1638. (Year: 2010).*

* cited by examiner

*Primary Examiner* — Jack W Keith
*Assistant Examiner* — Daniel Wasil
(74) *Attorney, Agent, or Firm* — Stetina Brunda Garred & Brucker

(57) ABSTRACT

The disclosure is directed to a fusion generator that includes a spherical housing. The generator may include a plurality of coils. The plurality of coils may include a poloidal field coil and a toroidal field coil formed of a high-temperature superconducting tape or ribbon. The toroidal field coil may be tilted at an angle along a toroidal field coil axis. The generator may include a graphite-fiber or graphene wrap configured to provide rigidity to one or more portion of the generator.

11 Claims, 7 Drawing Sheets

FUSION GENERATOR

CROSS-REFERENCE TO RELATED APPLICATIONS

Not Applicable

FIELD OF THE INVENTION

The present disclosure relates to a fusion generator capable of generating forty times more energy than it consumes; that is, Q=40. Specifically, the disclosure relates to a Superconducting, Minimum-Aspect-Ratio Torus (SMART) capable of achieving a Q=40 energy output.

BACKGROUND

Fusion is a reaction in which two atomic nuclei (such as isotopes of hydrogen) fuse together to form a heavier nucleus (such as a helium nucleus). This process is performed continuously within stars such as our own Sun. During this process, some mass of the hydrogen is converted into energy and given off in the form of heat and light. For decades, scientists have been trying to develop clean, limitless energy by re-creating the conditions at the center of the sun, here on Earth.

Fusion generators are devices that are designed to create an environment suitable for fusion. The environment needs to provide substantial temperature, pressure, and confinement time to create a plasma in which fusion occurs. Energy from the reaction can be harnessed and converted into electricity. For example, water can be heated to create steam which in turn is used to spin one or more electricity generating turbines. Alternatively, using an aneutronic fusion reaction, charged particles can be converted into electrical power.

One problem that faces the development of fusion energy as a viable source of electricity is plasma confinement. Plasma instability in fusion generators results in large, periodic bursts of plasma known as edge localized modes (ELMs). ELMs lead to a significant expulsion of heat and particles against the plasma facing components which can lead to degradation and failure. Other instabilities include banana orbits and drift of the ions or electrons. These various instabilities make it difficult to shape and contain the plasma within a fusion generator.

Various generators such as tokamaks, stellarators, compact fusion reactors, polyhedral reactors, dense plasma focus device, and pulsed non-ignition reactors have been researched. However, no system is yet capable of maintaining plasma in a continuous steady state. A fusion energy gain factor, usually expressed with the symbol Q, is the ratio of fusion power produced in a fusion generator to the power required to maintain the plasma in steady state. The condition of Q=1, when the power being released by the fusion reactions is equal to the required heating power, is referred to as breakeven, or in some sources, scientific breakeven.

Presently, no fusion generator exists capable of achieving a condition of Q=40. The present disclosure sets forth systems and methods capable of achieving a condition of Q=40 while maintaining plasma in a continuous steady state. One such system is configured to apply a force or pre-stress to a portion of the toroidal field coil to reduce stress induced in the coil during use. A reduction of the induced stress not only increases the longevity of the coil but can lead to the creation of a higher central magnetic field.

SUMMARY OF THE INVENTION

One aspect of the present disclosure relates to a fusion generator capable of achieving an energy output of Q=40. The generator may include a spherical housing. The generator may include a plurality of coils, wherein the plurality of coils include a poloidal field coil and a toroidal field coil formed of a high-temperature superconducting tape or ribbon. In some aspects, the toroidal field coil may be tilted at an angle along a toroidal field coil axis. The generator may also include a graphite-fiber or graphene wrap configured to provide rigidity to one or more portions of the generator.

In some implementations, the generator may include a Helium-3 fuel source.

In some implementations, the generator may include a plurality of conductive, electrically isolated plates positioned along a portion of a vacuum vessel or a first wall. In some implementations, each one of the plurality of conductive, electrically isolated plates may be connected to a high-voltage power supply configured to adjust a voltage of each one of the plurality of conductive, electrically isolated plates in response to a measurement.

In some implementations, the generator may include at least one expandable container positioned adjacent to a portion of the toroidal field coil. A liquid may be located within at least one expandable container.

In some implementations, the generator may include a means for freezing the liquid within the at least one expandable container and at least one temperature sensor configured to monitor the temperature of the liquid.

In some implementations, the at least one temperature sensor may provide feedback to a central control station configured to control the means for freezing.

In some implementations, the generator may include a first wall, a blanket, and a diverter. In some implementations, one or more of the housing, first wall, blanket, and diverter may be formed of one or more high-manganese stainless steel, nitrogen-strengthened stainless steel, chromium-manganese-nickel steel, graphite fiber, and graphene.

In some implementations, the angle along the toroidal field axis may be between 60 degrees and 89 degrees.

In some implementations, the generator may include a central post configured to support a centering force. The central post may be formed of ceramic and configured to remove heat.

In some implementations, a portion of the generator may be formed of one or more nanoparticle, graphene-nanomaterial, graphene-nanocomposite, graphene-nanoplatelet, graphene-nanoribbon, graphene-nanoflake, graphene-nanopatterned structure, graphene-pillared structure, graphene oxide, reduced graphene oxide, functionalized reduced graphene oxide (frGO), and graphene-based polymer nanocomposite.

Another aspect of the present disclosure relates to a system configured for improving fusion energy output. The system may include one or more hardware processors configured by machine-readable instructions. The processor(s) may be configured to obtain sets of fusion generator operation information. Individual ones of the sets of fusion generator operation information may reflect plasma, material, fuel, or magnetic characteristics in one or more fusion generators. The processor(s) may be configured to train a machine-learning model with the obtained sets of fusion generator operation information such that the machine-learning model predicts dynamics of plasma, density of plasma, fuel cycle, magnetic fields, or material interactions in a spherical tokamak. The processor(s) may be configured to store the trained machine-learning model. The processor(s) may be configured to simulate, using information from the stored machine-learning model, dynamics of plasma, density of plasma, fuel cycle, magnetic fields, or material interactions during operation of the spherical tokamak.

In some implementations of the system, the processor(s) may be configured to build one or more quantum circuits to model the spherical tokamak. The processor(s) may be configured to simulate, using information from the stored machine-learning model and the one or more quantum circuit, dynamics of plasma, density of plasma, fuel cycle, magnetic fields, or material interactions during operation of the spherical tokamak.

In some implementations of the system, the processor(s) may be configured to output information representing dynamics of plasma, density of plasma, fuel cycle, magnetic fields, or material interactions during operation of the spherical tokamak.

In some implementations of the system, the processor(s) may be configured to transform the sets of fusion generator operation information by applying one or more algorithms prior to training the machine-learning model.

In some implementations of the system, the output information may include one or more animation, video, chart, graph, number, trend, and data set.

In some implementations of the system, the output information may include information related to surface dynamics, thermodynamics, motion, shape, mechanical properties, thermal properties, chemical properties, magnetic properties, or electrical properties.

In some implementations of the system, the plasma, material, fuel, or magnetic characteristics may include material properties, surface dynamics, thermodynamics, mechanical properties, thermal properties, chemical properties, magnetic properties, or electrical properties.

In some implementations of the system, the mechanical properties may include one or more of brittleness information, bulk modulus information, elasticity information, fatigue information, surface roughness information, yield strength information, fracture information, stress information, static tension information, compression information, shear information, bending information, creep information, ductility information, hardness information, impact information, slip information, toughness information, resilience information, intrinsic property, extrinsic property, and fatigue information.

In some implementations of the system, the thermal properties may include one or more of melting point information, eutectic point information, ductile-to-brittle transition information, thermal conductivity information, thermal diffusivity information, emissivity information, specific heat information, rate of temperature change information, Curie point information, and thermal expansion information.

In some implementations of the system, the electrical properties may include one or more of electrical conductivity information, capacitance information, resistivity information, susceptibility information, electrostriction information, magnetoelectric information, permittivity information, and piezoelectric information.

In some implementations of the system, the chemical properties may include one or more corrosion resistance information, reactivity information, surface energy information, surface tension information, pH information, and hygroscopy information.

In some implementations of the system, the magnetic properties may include one or more of diamagnetism information, Hall coefficient information, hysteresis information, magnetostriction information, magnetoresistance information, permeability information, piezomagnetism information, and spin Hall effect information.

In some implementations of the system, the processor(s) may be configured to machine one or more components of a fusion generator based on the output information.

Another aspect of the present disclosure relates to a method for improving fusion energy output. The method may include obtaining sets of fusion generator operation information. Individual ones of the sets of fusion generator operation information may reflect plasma, material, fuel, or magnetic characteristics in one or more fusion generators. The method may include training a machine-learning model with the obtained sets of fusion generator operation information such that the machine-learning model predicts dynamics of plasma, density of plasma, fuel cycle, magnetic fields, or material interactions in a spherical tokamak. The method may include storing the trained machine-learning model. The method may include simulating, using information from the stored machine-learning model, dynamics of plasma, density of plasma, fuel cycle, magnetic fields, or material interactions during operation of the spherical tokamak.

DETAILED DESCRIPTION OF THE INVENTION

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the disclosure or the claims.

The following description provides specific details, such as material types, dimensions, and processing conditions in order to provide a thorough description of embodiments of the disclosure. The features illustrated and/or described in connection with a form may be combined with the features of other forms. Such modifications and variations are intended to be included within the scope of the present invention, but not limiting thereof.

Figure 1A:
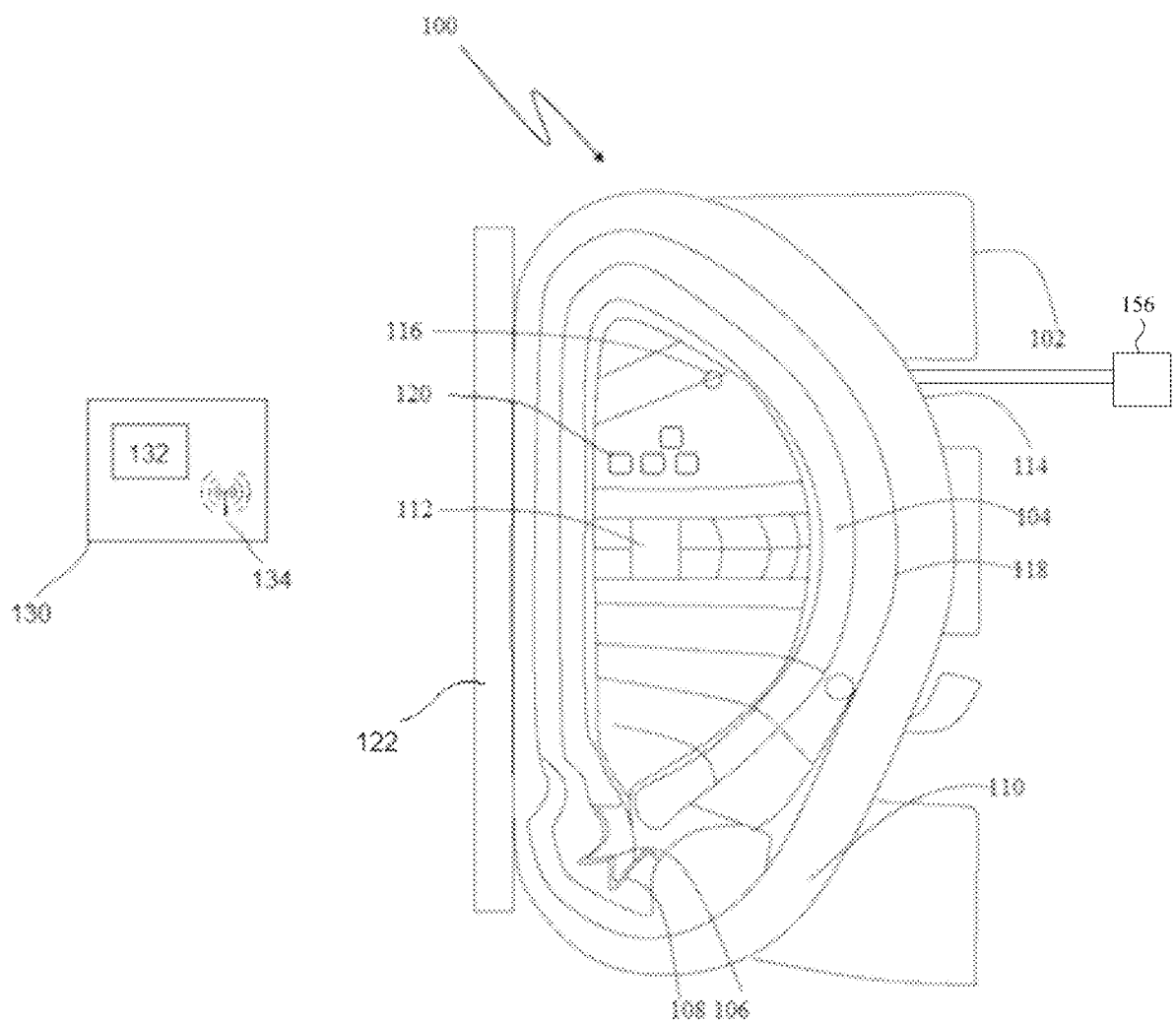
FIG. 1A illustrates a cross-section of a fusion generator, in accordance with one or more implementations.
Figure 1B:
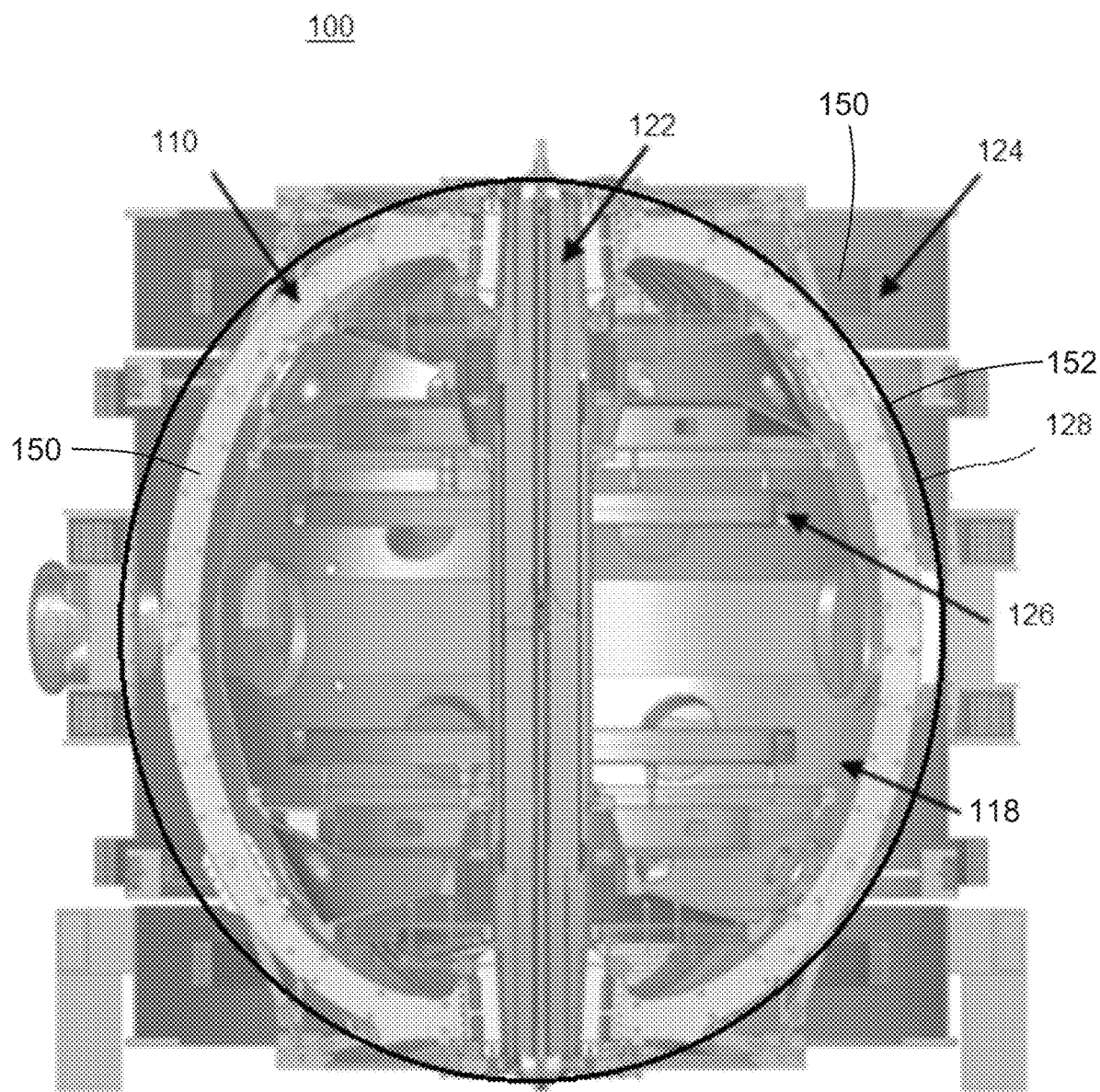
FIG. 1B illustrates a cross-section of a fusion generator, in accordance with one or more implementations.

FIG. 1 illustrates a cross-section of a fusion generator 100 in accordance with one aspect of the disclosure. The fusion generator 100 can be a type of generator known as a spherical tokamak. A spherical tokamak is a type of fusion generator based on the tokamak principle. It is notable for its very narrow profile, or aspect ratio [A=Major Radius/Plasma Radius=R/a]. A traditional tokamak has a toroidal confinement area that gives it an overall shape like a donut, complete with a large hole in the middle. The spherical tokamak reduces the size of the hole as much as possible, resulting in a plasma shape that is almost spherical, often compared with a cored apple.

Figure 2A:
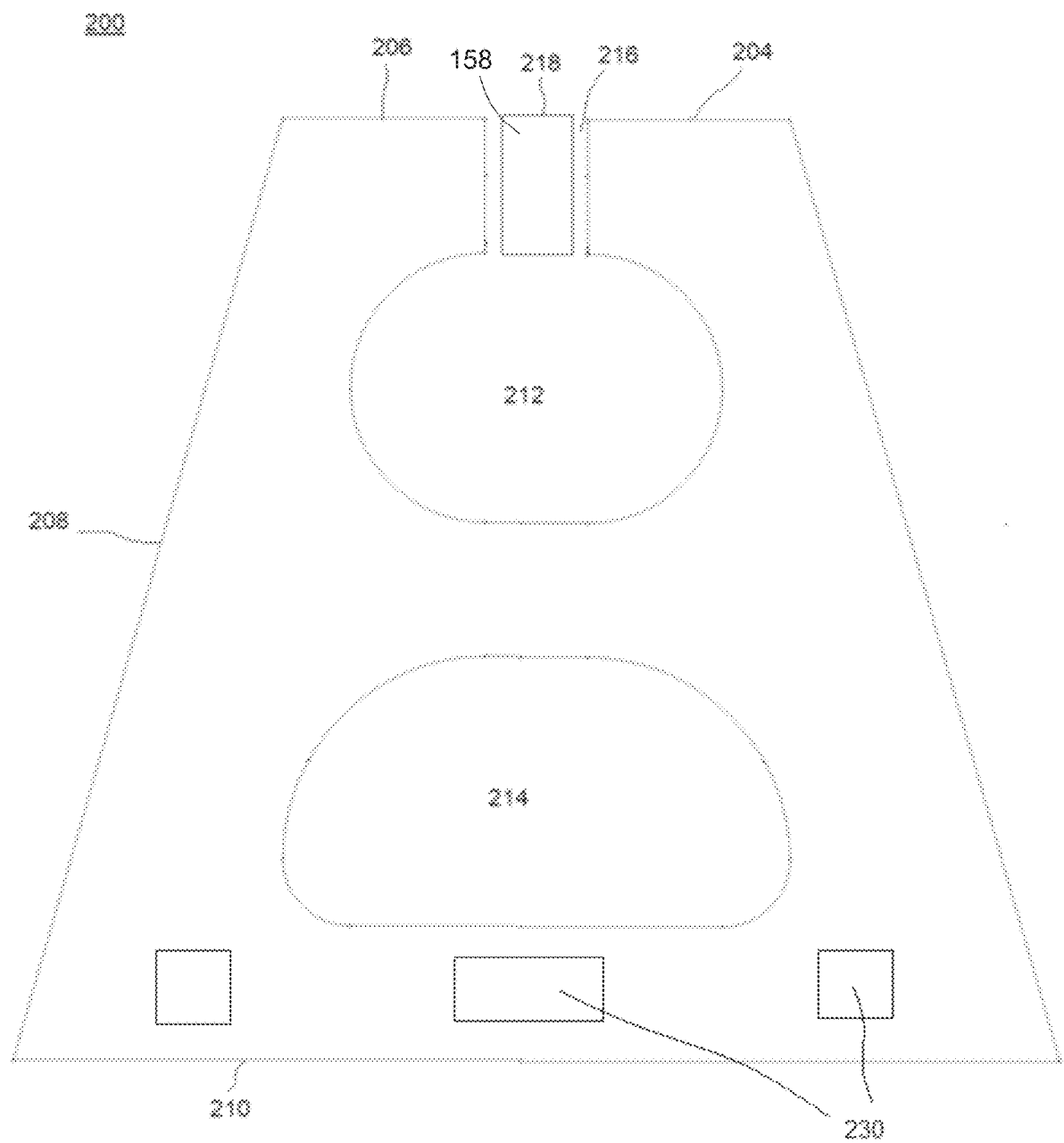
FIG. 2A illustrates a cross-section of a structure for applying a prestress to a portion of the toroidal field coil in combination with an expandable container, in accordance with one or more implementations
Figure 2B:
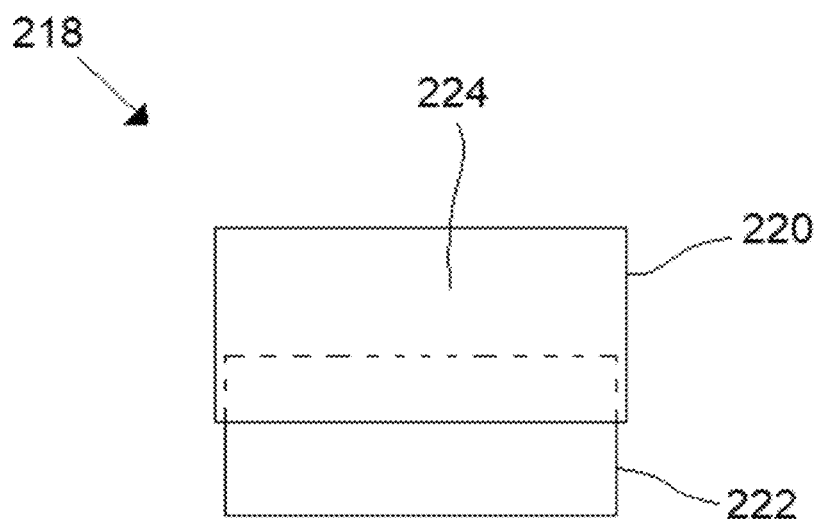
FIG. 2B illustrates an expandable container, in accordance with one or more implementations.

The spherical tokamak 100 may include a spherical housing 128 as illustrated in FIG. 2B. The spherical arrangement places the toroidal field coil much closer to the plasma, on average than in typical tokamak designs. This greatly reduces the amount of energy needed to power the toroidal field coil in order to reach any particular level of magnetic field within the plasma. Because smaller magnets cost less, this can lead to a reduction in cost of the generator. Another advantage to the spherical tokamak is that the plasma has an increase in stability compared to typical tokamak designs.

The spherical tokamak 100 can reach the same operational triple product numbers [Ion Temperature*Ion Pressure (Density)*Time] as conventional designs using one tenth the magnetic field. The ST design, through its mechanical arrangement, has much better q and thus allows for much more magnetic power instabilities within the plasma to appear.

In one aspect, the fusion generator 100 may have an R0 of 2.00 m; an a of 1.00 m; an h of 2.00 m; an R0/a of 2.0; an elongation (h/a) of 2.00; a B0 of 10 tesla; and a Bmax of 25 tesla.

Fusion generator 100 may include a fuel input and waste channel 102, first wall 104, toroidal magnet 110, divertor 106, divertor casing 108, breeding and/or shielding blanket 114, and vacuum vessel 118. During operation of the generator 100, components can become damaged and require replacement or repair. The integrity of the components can become compromised or degraded, for example, by fissures, cracks, fractures, craters, pits, and dents on the surface or within the components. Generator 100 may include at least one sensor 116 that can produce a signal representative of one or more parameters of the components indicative of one or more conditions or degradation present which may hinder proper functioning of the components. The at least one sensor 116 may include one or more sensing probe, imaging device, camera, fiber optic sensor, conductance sensor, acoustic sensor, temperature sensor, strain sensor, accelerometer, displacement sensor, and light sensor.

The breeding and/or shielding blanket 114 may surround a chamber within the fusion generator 100 and serve several purposes. While the first wall 104 may be directly exposed to the plasma, the breeding and/or shielding blanket 114 may absorb almost all neutron energy and act as a shield. Additionally, the heat created in the generator 100 by the fusion process may be transported away by a coolant that flows through the breeding and/or shielding blanket 114. Furthermore, the breeding and/or shielding blanket 114 may breed the necessary tritium or other fuel that the generator 100 uses. Due to the high flux of high energetic ions or neutrons and the associated material damage as well as helium generation in the structural material, the lifetime of the breeding and/or shielding blanket 114 is limited and blanket systems require several replacements during the lifetime of the generator 100. The coolant or breeding material used inside the breeding and/or shielding blanket 114 may also lead to corrosion of the breeding and/or shielding blanket 114. In some aspects, the generator 100 may not include a breeding and/or shielding blanket 114.

The vacuum vessel 118 can be a hermetically sealed container that houses the fusion reactions and plasma and acts as a first safety containment barrier. In one aspect, the vacuum vessel 118 may include walls having a solid cross-section and be formed of steel. In another aspect, the walls of the vacuum vessel 118 may have a laminated structure, being formed of several materials pressed and bonded or joined together. This may include two, three, four, five or more layers. In another aspect, the walls of the vacuum vessel 118 may be formed as a double wall having a hollow cross-section. The interior chamber may be filled with a variety of materials such as lead or a lithium containing salt. In yet another aspect, the walls of the vacuum vessel 118 may be formed as a triple wall with two separated hollow voids. A first material may be located in the first void and a second material may be located in the second void.

In some aspects, the walls of the vacuum vessel 118 may include or be coated with graphene or another fullerene. Graphene can reduce oxidation within the vacuum vessel 118 to aid in the reduction of cracks or other damage to the vacuum vessel 118 walls.

The vacuum vessel 118 provides a high-vacuum environment for the plasma, improves radiation shielding and plasma stability, acts as the primary confinement barrier for radioactivity, and provides support for in-vessel components such as the breeding and/or shielding blanket 114 and the divertor 106. Water, or other cooling medium, circulating adjacent to or within the walls of the vacuum vessel 118 is configured to remove the heat generated during operation and transfer the heat to electricity generating components.

The vacuum vessel 118 may include a channel having a circular horizontal cross-section. The channel may be supplied with fuel elements 112 such as deuterium and tritium or deuterium and helium-3. Plasma may be formed in the channel when the fusion generator 100 operates by generating, magnetically confining, and heating a gaseous plasma inside the toroidal channel. This allows for initiating a fusion reaction of the fuel elements 112.

A plurality of electromagnets may be configured for confining the plasma inside the channel. The plurality of electromagnets may be formed from a plurality of coils. The plurality of electromagnets are preferably, but not exclusively, made of superconducting materials forming continuous coils. The plurality of electromagnets may include a number of poloidal electromagnets formed by poloidal field coils, toroidal electromagnets formed by toroidal field coils, and merging compression magnets formed by merging compression coils. In one aspect, the plurality of electromagnets may be configured as high-performance, internally cooled superconductors, also known as "cable-in-conduit conductors," in which bundled superconducting strands—mixed with copper—are cabled together and contained in a structural steel jacket. Superconducting magnets are able to carry higher current and produce stronger magnetic fields than conventional counterparts. They also consume less power and are cheaper to operate. The superconducting magnets are provided so as to generate lines of magnetic force around the vacuum vessel 118 and stably maintain the plasma formed in the channel.

In some aspects, the plurality of electromagnets may be formed of a high-temperature superconducting tape or ribbon. This tape or ribbon may be about 2-6 mils thick and 2-6 mils wide. In some aspects, the tape or ribbon may be formed of rare earth barium copper oxide (ReBCO). The tape or ribbon may include a rectangular, square, or circular cross-section. The tape or ribbon may be surrounded by a suitable insulative material.

In some aspects, a first electromagnet, for example a toroidal field magnet, may be formed by a high-temperature superconducting tape or ribbon. The tape or ribbon may be wound perpendicular to the axis of the electromagnet or tilted at an angle relative to the axis. In one aspect, the angle may be approximately 60-89 degrees relative to the axis.

In some aspects, a second electromagnet, for example a poloidal field magnet, may be formed by a high-temperature superconducting tape or ribbon 150. The tape or ribbon 150 may be wound perpendicular to the axis of the electromagnet or tilted at an angle relative to the axis. In one aspect, the angle may be approximately 60-89 degrees relative to the axis.

In some aspects, a third electromagnet, for example a merging compression magnet, may be formed by a high-temperature superconducting tape or ribbon 150. The tape or ribbon 150 may be wound perpendicular to the axis of the electromagnet or tilted at an angle relative to the axis. In one aspect, the angle may be approximately 60-89 degrees relative to the axis.

In some aspects, the generator 100 may include an additional set of electromagnets positioned inside of the vacuum vessel to control the plasma. This additional set of electromagnets may be formed of copper.

Figure 1C:
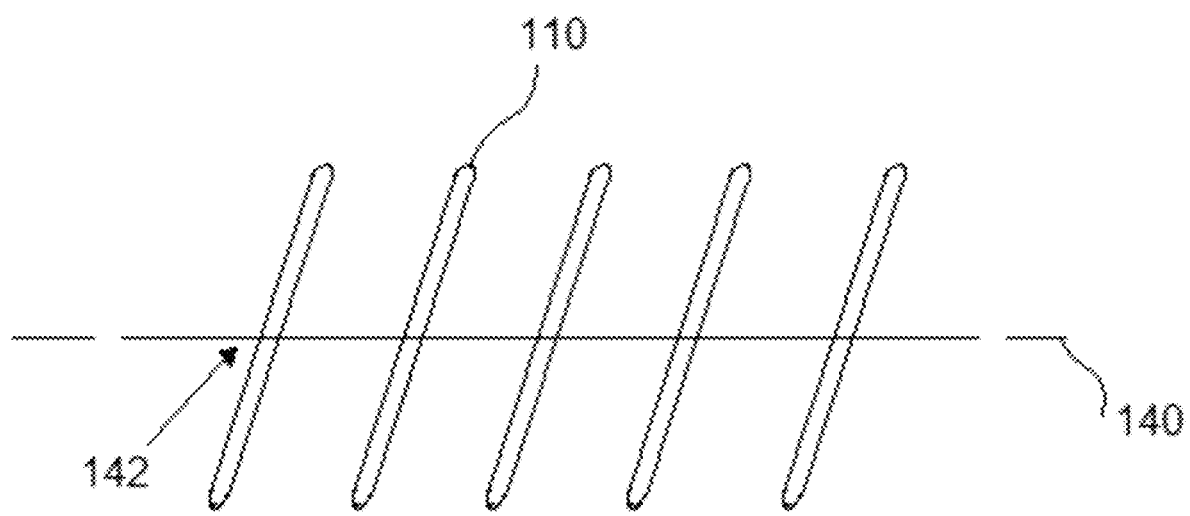
FIG. 1C illustrates an arrangement of slanted coils, in accordance with one or more implementations.

In one aspect, as illustrated in FIG. 1C, the toroidal field coils forming the toroidal magnet 110 may be slanted or tilted at an angle 142 relative to an axis 140 passing through the center of the toroidal field coils. By slanting or tilting the coils relative to the axis 140, it is possible to minimize the overturning moment (torque) on the toroidal magnet 110. The angle 142 may be approximately 60 to 89 degrees.

The magnetic fields created by the plurality of electromagnets may confine plasma particles to allow the plasma to achieve the conditions necessary for fusion. The toroidal magnet 110 generates an intense "toroidal" field, directed the long way around the channel. In one aspect, a central solenoid creates a second magnetic field directed along the "poloidal" direction, the short way around the channel. The two field components result in a twisted magnetic field that confines the particles in the plasma. The generator may include a third set of field coils 124 generates an outer poloidal field that shapes and positions the plasma. The generator 100 may also include a set of merging compression magnets 126. The toroidal 110, poloidal 124, and compression magnets 126 may be formed from groups of coils or as a continuous coil. For example, the toroidal magnet 110 may be formed in six sections, each section having approximately 60 identical turns. In this configuration, the turns are identical and may include a constant thickness. Likewise, the poloidal magnet 124 or compression magnet 126 may be formed of a plurality of coils spaced apart form one another. In some aspects the poloidal magnet 124 may be located at least partially within the toroidal magnet 110. In some aspects, a strong outer casing may support one or more groups of coils.

When operating the toroidal magnet 110, a portion of the inner leg of the toroidal coil may become highly stressed. This stress can reduce the efficiency of the toroidal magnet and decrease the life of the coil. A reduction of this stress not only increases the longevity of the coil but can lead to the creation of a higher central magnetic field.

FIG. 2A illustrates a cross-section of a portion of the spherical tokamak 100 housing the toroidal field coils. The toroidal field coils may be surrounded by a structure 200 formed of a high-manganese stainless steel, for example Nitronic 40 (Cr 21 Ni 6 Mn 9), Nitronic 50 (Cr 22, Ni 12.5, Mn 5, Mo 2.25, Si 1 C 0.06 Fe Bal.), or AISI Type 216. The structure 200 is configured to apply a poloidal torque in an outer case of the toroidal field coils to reduce or eliminate vertical tension in the inner leg of each toroidal field coil. The structure 200 may include a first arm 206 and a second arm 204. The structure may be actuated by an expandable container 218 positioned at gap 216. When the expandable container 218 is expanded, first arm 206 and second arm 204 move apart, thus applying a force or prestress to a portion of the toroidal field coil positioned in bean-shaped opening 214. The bean-shaped opening 214 has a shape corresponding to the shape of the toroidal field coil contained therein. In some aspects, this shape may take the form of a semi-circle. In one aspect, the force may be limited to an inner leg portion of the toroidal field coil. In other aspects, the force may be applied to the entire toroidal field coil.

Structure 200 may include an inner wall 210, an upper wall 208, and a lower wall 232. The structure 200 is tallest at the inner wall 210 and tapers down to a first arm end wall 201 and a second arm end wall 203. In addition to the bean-shaped opening 214, the structure 200 includes an arcuate space 212 separating the first arm 206 and the second arm 204. The arcuate space 212 may be defined by a first arm semi-circle region 219, second arm semi-circle region 221, and a linear region 223 that connects the first arm semi-circle region 219 and the second arm semi-circle region 221.

Structure 200 is symmetrical along a central axis extending from the inner wall 210 towards the first arm end wall 201 and the second arm end wall 203. The bean-shaped opening 214, arcuate space 212, gap 216, and expandable container 218 are positioned along the central axis.

In some aspects, the structure 200 may include one or more hollow areas 230 located at various portions of structure 200. In some aspects, the one or more hollow areas 230 may create free ends for the first arm 206 and the second arm 204 at the inner wall 210.

The expandable container 218 may be positioned in gap 216. Gap 216 extends between a first arm gap wall 217 and a second arm gap wall 215. In one aspect, first arm gap wall 217 and second arm gap wall 215 may be parallel to one another. In other aspects, first arm gap wall 217 and second arm gap wall 215 may be angled relative to one another.

The expandable container 218 may include one or more bellows, pistons, or other features that allow for expansion of the case as a liquid contained therein expands. In some aspects, the container 218 may expand via pneumatic or hydraulic means. The expandable container 218 may be formed of a single material, or of a plurality of materials. In one aspect, portions of the expandable may be rigid while other portions are flexible allowing for expansion in a desired direction.

FIG. 2B illustrates an expandable container 218 in the form of a piston. The expandable container may include a first portion 220 and a second portion 222 that is slidably positioned in first portion 220. A liquid may be contained within a chamber 224 in the first portion 220, such that when the liquid expands, the second portion 222 is pushed out of the first portion 220.

Figure 2C:
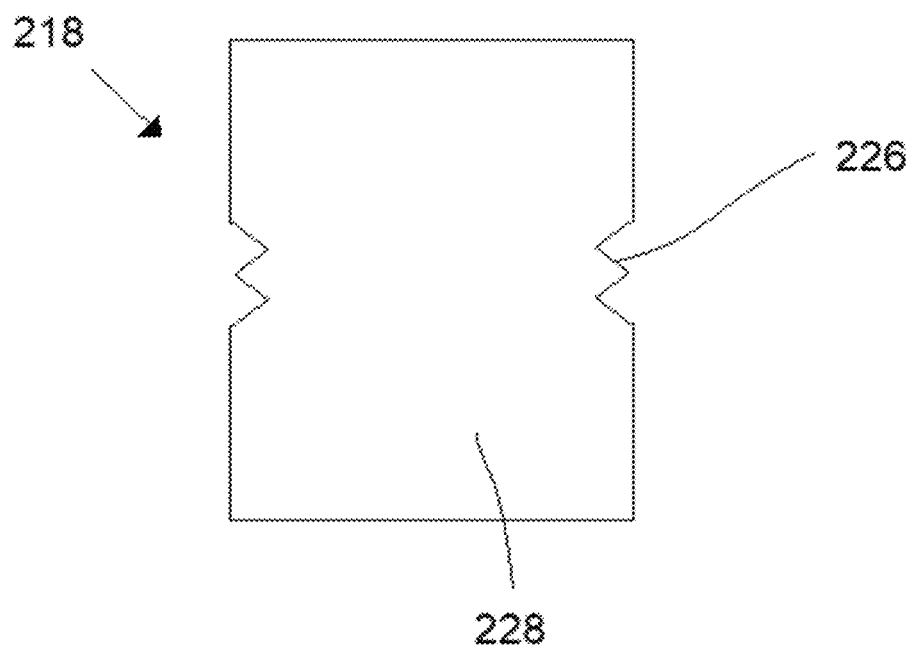
FIG. 2C illustrates an expandable container, in accordance with one or more implementations.

FIG. 2C illustrates an expandable container 218 having a bellows 226. A liquid capable of expansion is located within the interior 228 of the container 218. As the liquid expands, for example by freezing, the container 218 expands stretching out bellows 226.

The liquid contained in the expandable container may be configured to expand upon freezing. In one aspect, the liquid may include water. The water may include impurities such as dust, dirt, chemicals, biological contaminants, and radiological contaminants or additives such as salts, in solution, and miscible (compatible) liquid additives, such as alcohols. In some aspects, the liquid may include bismuth. Water is an ideal liquid because ice remains in an expanded, low-density hexagonal, cubic, or orthorhombic state, and can exert a great pressure, up to 200 MPa, while in any of these states.

In one aspect, a pre-stress is applied to the toroidal field coil when the liquid is frozen. The coil may be moved from a first position to a second position when a force or pre-stress is applied to the coil by structure 200. In one aspect, the coil may be moved at least 1 degree as a result of the force or pre-stress.

The generator 100 may include means for freezing the liquid 158 contained within the expandable container. The means for freezing 158 may include a freezer, liquid gas, such as liquid nitrogen or superfluid helium, or other device capable of freezing a liquid. In one aspect, the means for freezing 158 may also be used for reducing the temperature of the plurality of superconducting coils used in the various magnet systems.

At least one temperature sensor may be configured to monitor the temperature of the liquid within the container. In one aspect, the at least one temperature sensor may provide feedback to a central control station 130. The central control station 130 may control the means for freezing 158 in order to freeze the liquid. The central control station 130 may receive information from the at least one temperature sensor over a wired or wireless communication channel.

The generator 100 may also include a means for warming the liquid contained within the expandable container. Feedback provided by the at least one temperature sensor may allow the central control station to reduce the amount of force applied by the structure 200 via the frozen liquid as desired. The means for warming may melt the liquid so that no force is applied to the toroidal field coil to allow the coil to obtain an unstressed condition.

In some aspects, the central solenoid induces the majority of the magnetic flux change needed to initiate the plasma, generate the plasma current, and maintain this current during the burn time. The central solenoid can be made of six independent coil packs that use a ReBCO superconducting conductor, held together by a vertical pre-compression structure.

In other aspects, the generator 100 may include a rigid, ceramic central post 122 to support a centering force on the toroidal field coils. The central post 122 may provide a way to harness heat lost during the fusion reaction.

The breeding and/or shielding blanket 114 may cover the inner walls of the vacuum vessel 110 to protect the steel structure and the superconducting toroidal field magnets from heat and high-energy neutrons produced by the fusion reactions. As the neutrons are slowed in the breeding and/or shielding blanket 114, their kinetic energy is transformed into heat energy and collected by the water or other coolant. The toroidal channel can be lined with the breeding and/or shielding blanket 114.

The toroidal channel may also house diverter 106 which may be located along the bottom wall in a region communicating with a cavity via an annular opening defined by bottom-end edges of the shielding portions. The divertor 106 may extract heat and ash produced by the fusion reaction, minimize plasma contamination, and protect the surrounding walls from thermal and neutronic loads. The divertor 106 communicates with the toroidal channel and is used for purifying the plasma supplied to the divertor 106.

An array of highly-conducting, electrically-isolated plates 120 may be located along a portion of the fusion generator 100. The array may be positioned at the top, side, or bottom of the fusion generator 100. The array may take a variety of shapes and extend over a large portion of the fusion generator 100. The array may be formed by a plurality of individual plates 120 or from a plurality of groups of individual plates 120.

Each plate 120 in the array may be fabricated from a metal capable of withstanding high-temperatures that has a high electrical conductivity. In some aspects, the plates 120 may be formed of one or more of steel, stainless steel, copper, beryllium, titanium, lithium, lead, hafnium carbide, tungsten, tungsten carbide, hafnium tantalum carbide, and alloys thereof. The plates 120 may be electrically isolated from one another as well as from components of the fusion generator 100. Any high-temperature withstanding electrically insulative material may be used. In some aspects, ceramic may be used to electrically insulate each plate 120 of the array.

The array may be positioned within the interior of the fusion generator 100 along a portion of the inner wall or first wall, outer wall or second wall, or vacuum vessel. The array may be positioned on the inner surface or outer surface of the inner wall or first wall 104, outer wall or second wall, breeding and/or shielding blanket 114, or vacuum vessel 118. Each plate 120 in the array may be associated with a high-voltage power source 156 that is configured to create a desired voltage potential or current within each plate 120. The voltage or current in each plate 120 may be adjusted to increase the stability of plasma within the fusion generator 100.

The array may communicate with a central control station 130. Central control station 130 includes a processor 132 equipped with artificial intelligence and machine learning capabilities. Information derived from the array may be transmitted to the central control station 130 over a wired or wireless communication channel. The processor 132 may use the information to train a machine learning model to determine ideal parameters to stabilize the plasma within the generator 100. The central control station 130 may transmit over the wired connection, or using a wireless transceiver 134, the ideal parameters to the array to adjust a voltage or current of one or more plates 120 within the array. This feedback is used to correct any plasma instabilities or shape the plasma to a desired shape. In some aspects, the array may shape the plasma to shift a portion of the plasma to the diverter 106 or to allow outer flux surfaces of the plasma to be scraped off as heat or high energy particles along other portions of the generator 100.

In one aspect, the generator 100 may operate using an aneutronic process that reduces the damage to components of the generator 100. This may allow for simple conversion of the energy of charged particles into electricity. One such process may include utilizing deuterium and helium-3. Helium-3—sometimes also known as "helion" is a one-neutron isotope of helium that is formed as cosmic rays bombard helium-4 in the solar wind that is produced naturally through fusion in the sun. Unfortunately, Earth's atmosphere and magnetic field repel ionized helium-3, and, consequently, there are very minimal quantities in existence on Earth. Besides primordial deposits, small quantities of helium-3 can also be attained as products of tritium decay from fission reactors and nuclear weapons. The basic goals in deuterium-helium-3 fusion are to use either a tokamak or inertial electrostatic confinement to control the fusion of D and He-3 to produce an energetically efficient and minimally radioactive fusion reaction as a source of electricity.

In another aspect, the fuel source 112 may comprise deuterium and tritium. In this reaction, one deuterium nucleus fuses with one tritium nucleus, giving one helium nucleus, one free neutron, and 17.6 MeV of energy.

The fusion generator 100 may utilize electrostatic direct conversion which uses the motion of charged particles to create voltage. This voltage may drive electricity in a wire which becomes electrical power. It is the reverse of phenomena that use a voltage to put a particle in motion. In one aspect, the central rigid post 122 may be configured for electrostatic direct conversion.

Various components of the fusion generator 100 may be formed of ultra-high strength materials. This creates a robust generator 100 capable of withstanding large amounts of force. In some aspects, the generator 100 can withstand forces generated during an earthquake or tsunami. In other aspects, the generator 100 may be deployed from one or more airplanes or helicopters for use as a tactical power plant to meet the needs of a deployed tactical brigade.

Nitronic 40 (Cr 21 Ni 6 Mn 9) is a tough, high-strength, austenitic stainless with low magnetic permeability. It is a high-manganese stainless steel with high strength and excellent resistance to corrosion at high temperatures.

Nitronic 50 (Cr 22, Ni 12.5, Mn 5, Mo 2.25, Si 1 C 0.06 Fe Bal.) is an even tougher, corrosion-resistant stainless, commonly used for saltwater and marine applications. Nitronic 50 is a nitrogen-strengthened stainless steel. It exhibits the highest corrosion resistance of any stainless steel grade, and offers an excellent combination of strength, ductility, and toughness, even at cryogenic temperatures. AISI Type 216 is an Austenitic Nonstandard grade Stainless Steel. It is commonly referred to as Chromium-Manganese-Nickel steel. It is composed of (in weight percentage) 0.08% Carbon (C), 7.5-9.0% Manganese (Mn), 1.00% Silicon (Si), 17.5-22.0% Chromium (Cr), 5.0-7.0% Nickel (Ni), 0.045% Phosphorus (P), 0.03% Sulfur (S), 2.0-3.0% Molybdenum (Mo), 0.25-0.50% Nitrogen (N), and the base metal Iron (Fe). Other designations of AISI Type 216 stainless steel include UNS S21600 and AISI 216. Graphite fiber and graphene may also form all or a portion of components of the generator 100.

In one aspect, a graphene-based material, derivative thereof, or other fullerene may be used to protect or repair plasma facing and other components of the fusion generator 100. Graphene-based materials, derivatives thereof, or other fullerenes can act as a protective layer against sputtering, ion, or neutral interactions with material surfaces. Graphene-based materials may be used to preferentially self-heal plasma-induced defects, adsorb molecular hydrogen, and act as a platform for magnetic diagnostics in magnetic-confinement fusion generators. In some aspects, entire portions of components may be fabricated using graphene-based materials or derivatives thereof. In other aspects, graphene-based materials may be used as a coating on surfaces of components or may be used to repair defects such as cracks, voids, or pits on surfaces of components.

Graphene is an allotrope of carbon one atom thick. It may be formed in planar sheets in a lattice structure resembling a honeycomb. Graphene based nanomaterial may possess exceptional mechanical, physical, and thermal properties. Graphene can withstand very high temperature and may be used as a coating material acting as a protective layer against sputtering due to energetic ions. Graphene-based materials may also slow down impurity collection on the material surfaces of fusion generators.

Efficient sputter protection of components can be achieved by fabricating components or coating components with a graphene-based material, derivative thereof, or other fullerene. Graphene nanocomposites comprising several elements have strong radiation resistance properties and can be used to form at least a portion of fusion generator components. For example, a graphene-aluminum composite includes remarkable irradiation resistance as a result of the excellent sink strength of the graphene layers for irradiation-generated defects.

One or more layers of graphene-based material or derivative thereof may be deposited on the generator 100 at one or more location needing reinforcement, fabrication, or in need of repair. The graphene-based material, derivative thereof, or other fullerene may have a size in the range of micrometric to nanometric. The graphene-based material or derivative thereof, may be selected from the group consisting of graphene-nanomaterials, graphene-nanocomposites, graphene-nanoplatelets, graphene-nanoribbons, graphene-nanoflakes, graphene-nanopatterned structures, graphene-pillared structures, graphene oxide, reduced graphene oxide, functionalized reduced graphene oxide (frGO) and graphene-based polymer nanocomposites.

In one aspect, a 3D printer may be configured to deposit graphene-based material, derivative thereof, or other fullerene at a desired location. The 3D printer may be configured as a direct-write system to print free-standing columns comprising ordered arrangements of graphene-based nano-material, to form super crystals. The arrangements may include various spacings and configurations and have various shaped and sized columns. The nanomaterial can have a varied size range, e.g., 50 nm to 5 nm. In one aspect the nanomaterial may include spherical nanoparticles and can have a diameter or length in the range of 20 to 10 nm. In some aspects, the nanomaterial may have similar size or shape, and in other aspects the nanomaterial may have different size or shape.

In some aspects, the graphene-based nanomaterial can form spherical nanoparticles. In some aspects, the spherical nanoparticles can be coated with short organic molecules, for example oleic acid. The organic molecules act as active sites for additional strengthening of the material by heat-treatment in an inert atmosphere, which results in the creation of new bonds through crosslinking between the organic molecules of adjacent nanoparticles. The crosslinking increases the stiffness of the organic molecules, making it resistant to higher loads and temperature. This process creates stronger and more robust macroscale structures having desired shapes to fabricate, repair, or maintain portions of plasma facing components or other generator components.

In some aspects, a graphite-fiber or graphene wrap 152 may be used to provide additional strength and rigidity to various components of the generator 100. A graphite-fiber or graphene wrap 152 or patch may be adhered to portions of the generator 100 that incur the most stress. In some aspects the wrap 152 may be made of several layers of graphite, graphene, other fullerene, or a combination thereof. In other aspects, the wrap 152 may be made of a single layer of graphite, graphene, other fullerene, or combination thereof. In some aspects, the wrap 152 or patch may be embedded into a matrix. In other aspects, the wrap 152 or patch may be adhered to the various components of the generator 100.

Figure 3:
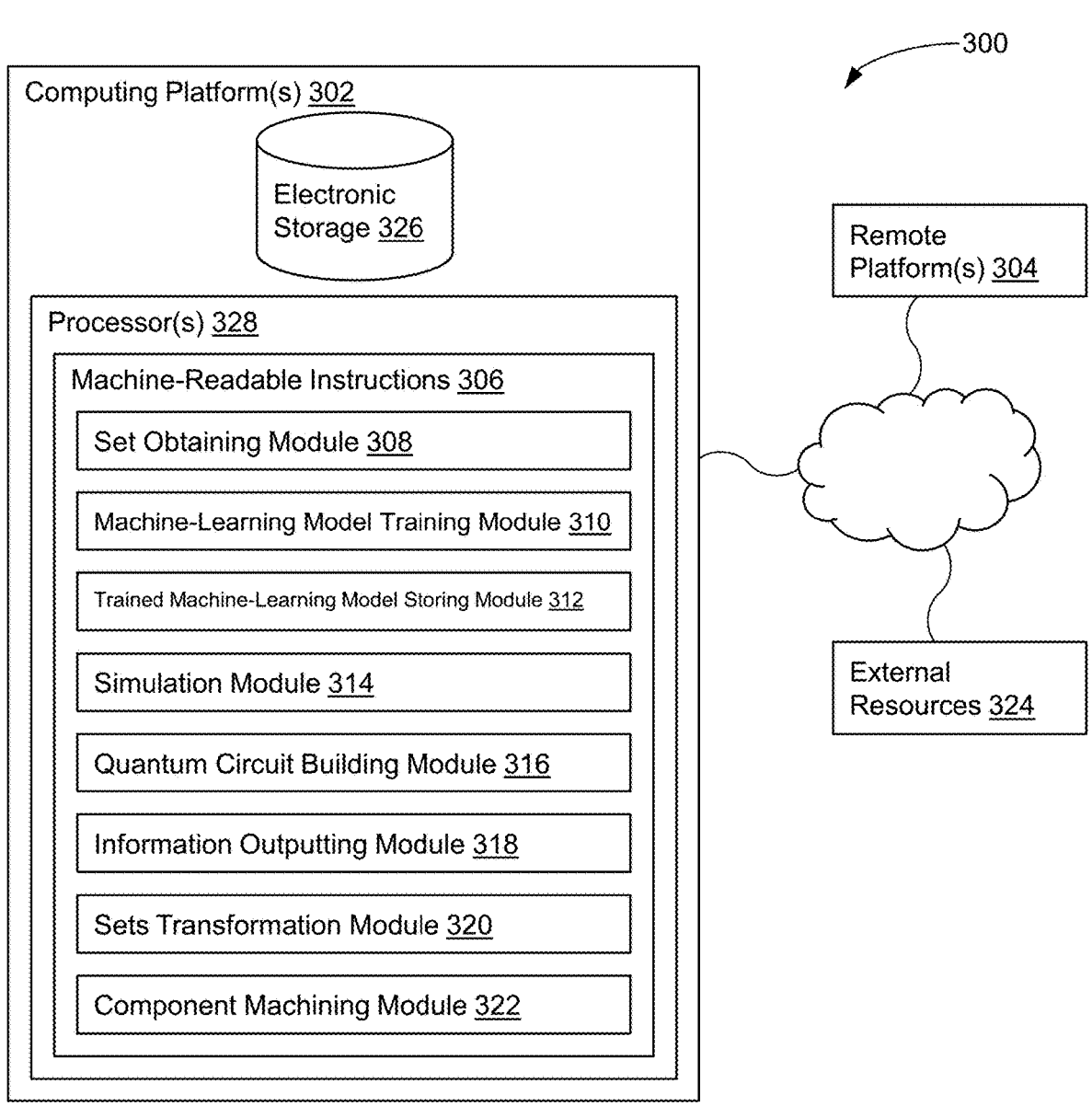
FIG. 3 illustrates a system configured for improving fusion energy output, in accordance with one or more implementations.

FIG. 3 illustrates a system 300 configured for improving fusion energy output, in accordance with one or more implementations. System 300 may be configured to optimize the spherical tokamak to achieve a fusion energy gain factor of at least Q=40. System 300 may be configured to simulate components, processes, and interactions within the spherical tokamak. In some implementations, system 300 may include one or more computing platforms 302. Computing platform (s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via remote platform(s) 304.

Computing platform(s) 302 may be configured by machine-readable instructions 306. Machine-readable instructions 306 may include one or more instruction modules. The instruction modules may include computer program modules, the instruction modules may include one or more of set obtaining module 308, machine-learning model training module 310, trained machine-learning model storing module 312, simulation module 314, quantum circuit building module 316, information outputting module 318, sets transforming module 320, component machining module 322, and/or other instruction modules.

Set obtaining module 308 may be configured to obtain sets of fusion generator operation information. Sets of fusion generator operation information may be received from a plurality of fusion data sources. By way of non-limiting example, the plurality of fusion data sources may include one or more nuclear energy libraries, public or private universities, national labs, international fusion projects, or private research facilities. Any source having information related to fusion processes may be considered a fusion data source. The fusion data sources may be remote from one another and include a plurality of disparate information sets. By way of non-limiting example, the sets of fusion generator operation information may be obtained from the Helically Symmetric Experiment, Wendelstein 7-X, Compact Auburn Torsatron, Oak Ridge National Laboratory, and Princeton Plasma Physics Laboratory. Additionally, the plurality of disparate information sets may include heat parameters, energy parameters, material information, operational parameters, nuclear parameters, models, simulations, and degradation parameters.

Individual ones of the sets of fusion generator operation information may reflect plasma characteristics, material characteristics, fuel characteristics, or magnetic characteristics in at least a portion of one or more fusion generators. By way of non-limiting example, the plasma characteristics, material characteristics, fuel characteristics, or magnetic characteristics may include material properties, surface dynamics, thermodynamics, mechanical properties, thermal properties, chemical properties, magnetic properties, or electrical properties.

By way of non-limiting example, the mechanical properties include one or more of brittleness information, bulk modulus information, elasticity information, fatigue information, surface roughness information, yield strength information, fracture information, stress information, static tension information, compression information, shear information, bending information, creep information, ductility information, hardness information, impact information, slip information, toughness information, resilience information, intrinsic property, extrinsic property, and fatigue information.

By way of non-limiting example, the thermal properties may include one or more of melting point information, eutectic point information, ductile-to-brittle transition information, thermal conductivity information, thermal diffusivity information, emissivity information, specific heat information, rate of temperature change information, Curie point information, and thermal expansion information.

By way of non-limiting example, the electrical properties may include one or more of electrical conductivity information, capacitance information, resistivity information, susceptibility information, electrostriction information, magnetoelectric information, permittivity information, and piezoelectric information.

By way of non-limiting example, the chemical properties may include one or more corrosion resistance information, reactivity information, surface energy information, surface tension information, pH information, and hygroscopy information. By way of non-limiting example, the magnetic properties may include one or more of diamagnetism information, hall coefficient information, hysteresis information, magnetostriction information, magnetoresistance information, permeability information, piezomagnetism information, and spin hall effect information.

Machine-learning model training module 310 may be configured to train a machine-learning model with the obtained sets of fusion generator operation information such that the machine-learning model predicts dynamics of plasma, density of plasma, fuel cycle, magnetic fields, or material interactions in a spherical tokamak. In one aspect, the machine-learning training module 310 may process the fusion generator operation information to develop one or more training sets to train a machine-learning model. By way of non-limiting example, the one or more training sets may include information associated with one or more rf heating and current drive, remote handling, magnet system, measurement and diagnostic, material research, plasma facing component, plasma material interaction, plasma fueling system, fueling, and safety. The one or more training sets may include unlabeled information or labeled information.

In one aspect, the machine learning model may include algorithms directed to the physics of the fusion generator. In another aspect, the machine learning model may include algorithms directed to mechanical damage of the fusion generator. In another aspect, the machine learning model may include algorithms directed to additive manufacturing for components of the fusion generator. In another aspect, the machine learning model may include algorithms directed to heat load distribution and material interactions of the fusion generator. In another aspect, the machine learning model may include algorithms directed to heat absorption and cooling systems of the fusion generator. In another aspect, the machine learning model may include mitigation algorithms. In some aspects the machine learning model may be supervised. In some aspects the machine learning model may be unsupervised. And yet, in some aspects the machine learning model may require reinforcement training Trained machine-learning model storing module 312 may be configured to store the trained machine-learning model. The trained machine-learning model may be stored in any remote or local storage device. This may include any number of databases, servers, or other storage media. In some aspects, the trained machine-learning model storing module 312 may encrypt the model, or information associated with the model, prior to or during storage.

In some aspects, simulation module 314 may be configured to simulate, using information from the stored machine-learning model, dynamics of plasma, density of plasma, fuel cycle, magnetic fields, or material interactions during operation of the spherical tokamak. In other aspects, simulation module 314 may be configured to simulate, using information from the stored machine-learning model and the one or more quantum circuit, dynamics of plasma, density of plasma, fuel cycle, magnetic fields, or material interactions during operation of the spherical tokamak.

Quantum circuit building module 316 may be configured to build one or more quantum circuits to model the spherical tokamak. The quantum circuit building module 316 may include a graphical user interface to allow a user to build one or more quantum circuits. In one aspect, the user interface may include a drag and drop feature allowing a user to model various features of the spherical tokamak in numerous configurations. In another aspect, the quantum circuit building module 316 may develop one or more quantum circuits using artificial intelligence or machine learning. The quantum circuit building module 316 may suggest one or more circuits based on information received from a machine-learning model. Quantum circuit building module 316 may form a portion of remote platform 304.

Quantum circuit building module 316 may generate one or more quantum circuits having one or more qubits. The one or more quantum circuit may entangle the one or more qubits in order to take advantage of the superposition states of the qubits to exponentially reduce the amount of time it takes to model components and processes associated with the spherical tokamak. The one or more quantum circuits may include any number of quantum gates and measurements in order to create a desired model.

Information outputting module 318 may be configured to output information representing dynamics of plasma, density of plasma, fuel cycle, magnetic fields, or material interactions during operation of the spherical tokamak. By way of a non-limiting example, the output information may include one or more animation, video, chart, graph, number, trend, and data set. By way of non-limiting example, the output information may include information related to surface dynamics, thermodynamics, motion, shape, mechanical properties, thermal properties, chemical properties, magnetic properties, or electrical properties.

System 300 may be configured to determine if an output from the machine learning model indicates an improvement in one or more components of the fusion generator. By way of non-limiting example, the one or more component may include one or more of a shell, a fuel beam, central chamber, piston, wall, outer poloidal field coil, toroidal field coil, central solenoid, central post, plate, and support or structural component. The one or more components may include any physical component or process that forms part of a fusion generator. An improvement may include any improvement in one or more aspects of the one or more components. In one aspect, an improvement may be indicated by comparison to one or more threshold values. In some aspects, an improvement may indicate an increase in a fusion energy gain factor. For example, the improvement may indicate an energy gain factor of at least 40.

Sets transforming module 320 may be configured to transform the sets of fusion generator operation information by applying one or more algorithms prior to training the machine-learning model. Transforming the sets of fusion generator operation information may include aggregation of the information, removing unwanted information, replacing information, reducing errors in the information, filtering of the information, joining the information, sorting the information, or any combination thereof. Transforming the information may include changing or modifying the information in a way to make the information suitable for use in a desired analysis, simulation, model, or investigation.

Component machining module 322 may be configured to initiate machining of one or more components of a fusion generator based on the output information. The component machine module 322 may instruct one or more CNC device, additive manufacturing device, or other controllable manufacturing device to manufacture one or more components based on the output information.

In some implementations, computing platform(s) 302, remote platform(s) 304, and/or external resources 324 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 324 may be operatively linked via some other communication media.

A given remote platform 304 may include one or more processors configured to execute computer program modules. The computer program modules may be configured to enable an expert or user associated with the given remote platform 304 to interface with system 300 and/or external resources 324, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 324 may include sources of information outside of system 300, external entities participating with system 300, and/or other resources. In some implementations, some or all of the functionality attributed herein to external resources 324 may be provided by resources included in system 300.

Computing platform(s) 302 may include electronic storage 326, one or more processors 328, and/or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 326 may comprise non-transitory storage media that electronically stores information. The electronic storage media of electronic storage 326 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 326 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 326 may include one or more virtual storage resources (e.g., cloud storage, a virtual private network, and/or other virtual storage resources). Electronic storage 326 may store software algorithms, information determined by processor(s) 328, information received from computing platform(s) 302, information received from remote platform(s) 304, and/or other information that enables computing platform(s) 302 to function as described herein.

Processor(s) 328 may be configured to provide information processing capabilities in computing platform(s) 302. As such, processor(s) 328 may include one or more of a digital processor, an analog processor, a digital circuit designed to process information, an analog circuit designed to process information, a state machine, and/or other mechanisms for electronically processing information. Although processor(s) 328 is shown in FIG. 3 as a single entity, this is for illustrative purposes only. In some implementations, processor(s) 328 may include a plurality of processing units. These processing units may be physically located within the same device, or processor(s) 328 may represent processing functionality of a plurality of devices operating in coordination. Processor(s) 328 may be configured to execute modules 308, 310, 312, 314, 316, 318, 320, and/or 322, and/or other modules. Processor(s) 328 may be configured to execute modules 308, 310, 312, 314, 316, 318, 320, and/or 322, and/or other modules by software; hardware; firmware; some combination of software, hardware, and/or firmware; and/or other mechanisms for configuring processing capabilities on processor(s) 328. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 314, 316, 318, 320, and/or 322 are illustrated in FIG. 3 as being implemented within a single processing unit, in implementations in which processor(s) 328 includes multiple processing units, one or more of modules 308, 310, 312, 314, 316, 318, 320, and/or 322 may be implemented remotely from the other modules. The description of the functionality provided by the different modules 308, 310, 312, 314, 316, 318, 320, and/or 322 described below is for illustrative purposes, and is not intended to be limiting, as any of modules 308, 310, 312, 314, 316, 318, 320, and/or 322 may provide more or less functionality than is described. For example, one or more of modules 308, 310, 312, 314, 316, 318, 320, and/or 322 may be eliminated, and some or all of its functionality may be provided by other ones of modules 308, 310, 312, 314, 316, 318, 320, and/or 322. As another example, processor(s) 328 may be configured to execute one or more additional modules that may perform some or all of the functionality attributed below to one of modules 308, 310, 312, 314, 316, 318, 320, and/or 322.

Figure 4:
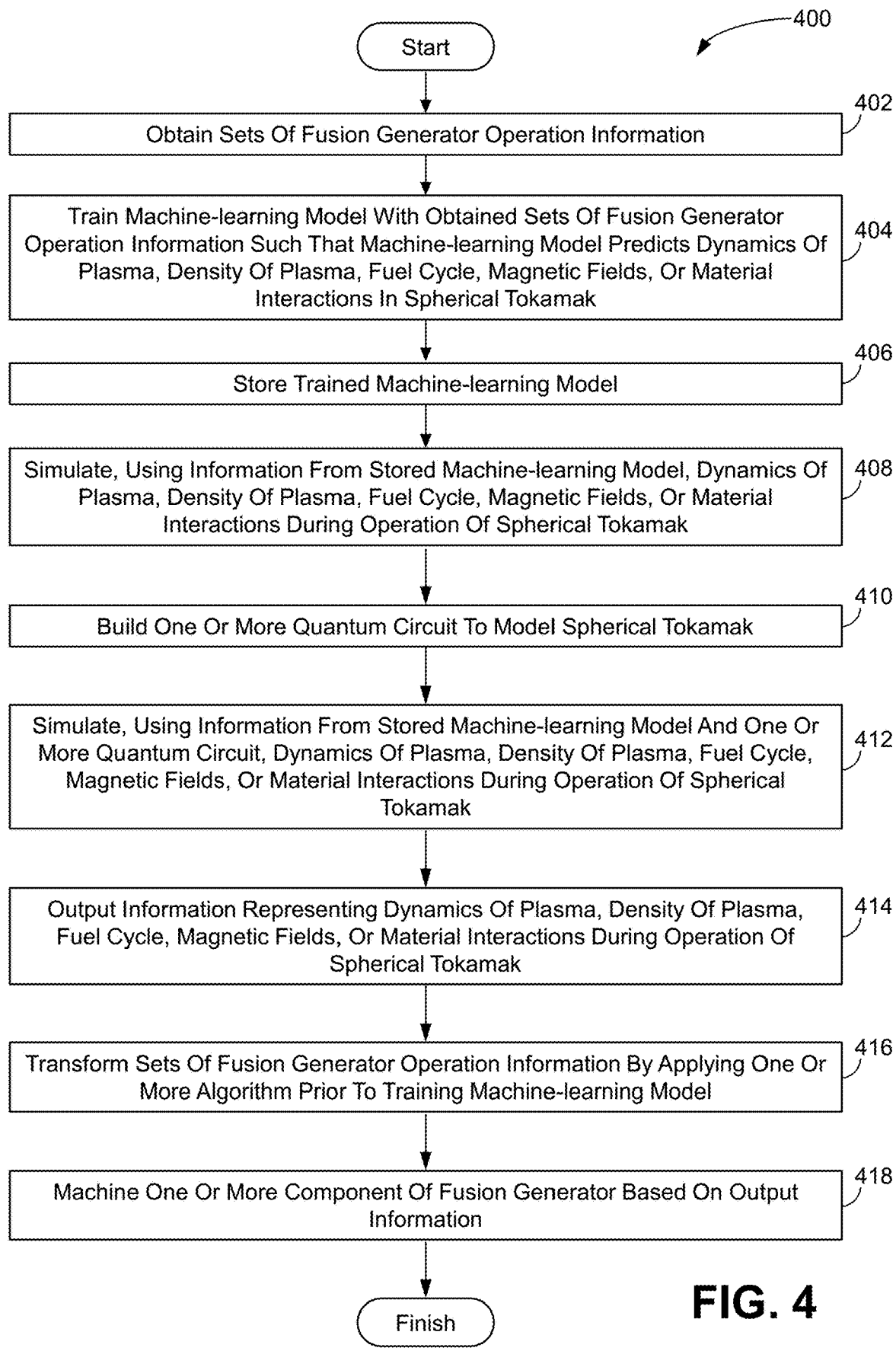
FIG. 4 illustrates a method for improving fusion energy output, in accordance with one or more implementations.

FIG. 4 illustrates a process 400 for improving fusion energy output, in accordance with one or more implementations. Process 400 may be used in the design and manufacture of one or more components of a spherical tokamak capable of achieving a fusion energy gain factor (Q) of at least 40. The operations of process 400 presented below are intended to be illustrative. In some implementations, process 400 may be accomplished with one or more additional operations not described, and/or without one or more of the operations discussed. Additionally, the order in which the operations of method 400 are illustrated in FIG. 4 and described below is not intended to be limiting.

In some implementations, process 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of process 400 in response to instructions stored electronically on an electronic storage medium. The one or more processing devices may include one or more devices configured through hardware, firmware, and/or software to be specifically designed for execution of one or more of the operations of process 400.

At step 402, the process 400 may include obtaining sets of fusion generator operation information. Individual ones of the sets of fusion generator operation information may reflect plasma, material, fuel, or magnetic characteristics in one or more fusion generators. As discussed above, this information may be obtained by a plurality of disparate information sources. The information may be related to any physical or simulated fusion generator. Operation 402 may be performed by one or more hardware processors configured by machine-readable instructions including a module that is the same as or similar to set obtaining module 308, in accordance with one or more implementations.

At step 404, the process 400 may include training a machine-learning model with the obtained sets of fusion generator operation information such that the machine-learning model predicts dynamics of plasma, density of plasma, fuel cycle, magnetic fields, or material interactions in a spherical tokamak. Operation 204 may be performed by one or more hardware processors configured by machine-readable instructions including a module that is the same as or similar to machine-learning model training module 310, in accordance with one or more implementations.

At step 406, the process 400 may include storing the trained machine-learning model. The storing may take place locally or remotely in any desired storage media. In some aspects, the storing may include encryption of information. Operation 406 may be performed by one or more hardware processors configured by machine-readable instructions including a module that is the same as or similar to trained machine-learning model storing module 312 in combination with one or more storage devices, in accordance with one or more implementations.

At step 408, the process 400 may include simulating, using information from the stored machine-learning model, dynamics of plasma, density of plasma, fuel cycle, magnetic fields, or material interactions during operation of the spherical tokamak. Operation 408 may be performed by one or more hardware processors configured by machine-readable instructions including a module that is the same as or similar to simulation module 314, in accordance with one or more implementations. In some aspects, operation 408 may take place in a quantum computer.

At step 410, the process 400 may include building one or more quantum circuits to model the spherical tokamak. Operation 410 may be performed by one or more hardware processors configured by machine-readable instructions including a module that is the same as or similar to quantum circuit building module 316, in accordance with one or more implementations. In some aspects, the building may be performed manually by a user using a graphical user interface. In some aspects, the building may be performed using artificial intelligence.

At step 412, the process 400 may include simulating, using information from the stored machine-learning model and the one or more quantum circuit, dynamics of plasma, density of plasma, fuel cycle, magnetic fields, or material interactions during operation of the spherical tokamak. Operation 412 may be performed by one or more hardware processors configured by machine-readable instructions including a module that is the same as or similar to simulation module 314, in accordance with one or more implementations. In some aspects, operation 412 may take place in a quantum computer.

At step 414, the process 400 may include outputting information representing dynamics of plasma, density of plasma, fuel cycle, magnetic fields, or material interactions during operation of the spherical tokamak. The information may be output to any desired output device or may be stored in a storage device. Operation 414 may be performed by one or more hardware processors configured by machine-readable instructions including a module that is the same as or similar to information outputting module 318, in accordance with one or more implementations.

At step 416, the process 400 may include transforming the sets of fusion generator operation information by applying one or more algorithms prior to training the machine-learning model. The one or more algorithms may optimize the information. The one or more algorithms may parse, clean, filter, add, label, or otherwise transform the information for use. Operation 416 may be performed by one or more hardware processors configured by machine-readable instructions including a module that is the same as or similar to sets transforming module 320, in accordance with one or more implementations.

At step 418, the process 400 may include machining one or more components of a fusion generator based on the output information. In one aspect, the output information may indicate a desired size, shape, strength, or orientation of one or more components. Machining components based on this operation leads to an improvement in operation of the fusion generator, better performance, and can lead to an increase in fusion efficiency. Operation 418 may be controlled by one or more hardware processors configured by machine-readable instructions including a module that is the same as or similar to component machining module 322, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A fusion generator, comprising:
a spherical housing;
a plurality of coils, wherein the plurality of coils include a poloidal field coil and a toroidal field coil that are each formed of a high-temperature superconducting tape or ribbon, wherein the toroidal field coil is tilted at an angle along a toroidal field coil axis, and wherein the toroidal field coil has a non-spiral shape; and
a graphite-fiber or graphene wrap configured to provide rigidity to the fusion generator.

2. The generator of claim 1, further comprising:
a helium-3 fuel source.

3. The generator of claim 1, further comprising:
a plurality of conductive, electrically isolated plates positioned along a portion of a vacuum vessel or first wall, wherein each one of the plurality of conductive, electrically isolated plates is connected to a high-voltage power supply configured to adjust a voltage of each one of the plurality of conductive, electrically isolated plates in response to a measurement.

4. The generator of claim 1, further comprising:
at least one expandable container positioned adjacent a portion of the toroidal field coil; wherein a liquid is contained with the at least one expandable container.

5. The generator of claim 4, further comprising:
a means for freezing the liquid; and
at least one temperature sensor configured to monitor the temperature of the liquid.

6. The generator of claim 5, wherein the at least one temperature sensor provides feedback to a central control station configured to control the means for freezing.

7. The generator of claim 1, further comprising:
a first wall;
a blanket;
a diverter; and wherein one or more of the housing, first wall, blanket, and diverter are formed of one or more of: Nitronic 40, Nitronic 50, AISI Type 216, nitrogen strengthened stainless steel, chromium-manganese-nickel steel, graphite fiber, and graphene.

8. The generator of claim 1, wherein the angle is between 60 degrees and 89 degrees.

9. The generator of claim 1, further comprising:
a central post configured to support a centering force.

10. The generator of claim 9, wherein the central post is formed of ceramic and configured to remove heat.

11. The generator of claim 1, wherein a portion of the generator is formed of one or more of: a nanoparticle, a graphene-nanomaterial, a graphene-nanocomposite, a graphene-nanoplatelet, a graphene-nanoribbon, a graphene-nanoflake, a graphene-nanopatterned structure, a graphene-pillared structure, a graphene oxide, a reduced graphene oxide, a functionalized reduced graphene oxide (frGO), a graphene-based polymer nanocomposite.

* * * * *